(12) United States Patent
Calle et al.

(10) Patent No.: US 11,129,441 B2
(45) Date of Patent: Sep. 28, 2021

(54) ARTICLE OF FOOTWEAR AND METHOD OF MANUFACTURING AN ARTICLE OF FOOTWEAR

(71) Applicant: NIKE, Inc., Beaverton, OR (US)

(72) Inventors: Juan M. Calle, Beaverton, OR (US); Steven Ploem, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 18 days.

(21) Appl. No.: 16/423,616

(22) Filed: May 28, 2019

(65) Prior Publication Data

US 2019/0365046 A1   Dec. 5, 2019

Related U.S. Application Data

(60) Provisional application No. 62/678,252, filed on May 30, 2018.

(51) Int. Cl.
*A43B 23/02* (2006.01)
*A43D 86/00* (2006.01)
*A43B 9/06* (2006.01)
*A43B 9/02* (2006.01)

(52) U.S. Cl.
CPC ............. *A43B 23/025* (2013.01); *A43B 9/02* (2013.01); *A43B 9/06* (2013.01); *A43D 86/00* (2013.01)

(58) Field of Classification Search
CPC .................................. A43B 23/025; A43B 9/16
See application file for complete search history.

(56) References Cited

U.S. PATENT DOCUMENTS

| 967,575 | A | * | 8/1910 | Schwander | A43B 9/06 36/16 |
|---|---|---|---|---|---|
| 4,704,808 | A | | 11/1987 | Bianchini et al. | |
| 4,809,447 | A | * | 3/1989 | Pacanowsky | A41B 11/005 2/239 |
| 4,852,275 | A | | 8/1989 | Bianchini et al. | |
| 5,664,343 | A | * | 9/1997 | Byrne | A43B 7/125 36/12 |
| 6,408,541 | B1 | * | 6/2002 | Moretti | A43B 7/082 36/12 |

(Continued)

FOREIGN PATENT DOCUMENTS

| CN | 1366453 A | 8/2002 |
|---|---|---|
| CN | 1633248 A | 6/2005 |

(Continued)

*Primary Examiner* — Jila M Mohandesi
(74) *Attorney, Agent, or Firm* — Quinn IP Law

(57) ABSTRACT

An article of footwear includes an upper and a strobel stitched to the upper at a series of stitches disposed in stitch holes that extend through the strobel. The strobel and the upper define a foot-receiving cavity with an inner surface of the strobel disposed at the foot-receiving cavity. A midsole is secured to the upper and an outer surface of the strobel is disposed at the midsole. The stitch holes are obstructed such that the stitch holes are not exposed to both the midsole and the foot-receiving cavity. Accordingly, when a flowable polymeric material is injected in a mold cavity to form the midsole with the lower portion of the upper and the strobel in the mold cavity, the stitch holes will not provide a path for entry of the flowable polymeric material into the foot-receiving cavity. A method of manufacturing an article of footwear is disclosed.

17 Claims, 14 Drawing Sheets

(56) References Cited

U.S. PATENT DOCUMENTS

| | | | |
|---|---|---|---|
| 6,463,612 B1 | 10/2002 | Potter | |
| 7,055,267 B2* | 6/2006 | Wilson | A43B 7/08 36/10 |
| 7,244,483 B2 | 7/2007 | Tawney et al. | |
| 7,752,772 B2 | 7/2010 | Hatfield et al. | |
| 8,595,956 B2* | 12/2013 | Byrne | A43B 13/186 36/31 |
| 8,839,530 B2 | 9/2014 | Smith et al. | |
| 9,072,336 B2* | 7/2015 | Borel | A43B 9/12 |
| 9,380,837 B2 | 7/2016 | Chon et al. | |
| 9,427,043 B2 | 8/2016 | Kodad | |
| 9,445,649 B2 | 9/2016 | Huffa et al. | |
| 9,468,258 B2 | 10/2016 | Ruiz et al. | |
| 9,474,326 B2 | 10/2016 | Langvin | |
| 2003/0163880 A1* | 9/2003 | Keidel | A43B 9/12 12/142 T |
| 2004/0049942 A1* | 3/2004 | Chen | A43B 7/125 36/3 A |
| 2008/0016717 A1* | 1/2008 | Ruban | A43B 23/022 36/21 |
| 2008/0244934 A1* | 10/2008 | Covatch | A43B 9/06 36/17 R |
| 2012/0297644 A1 | 11/2012 | Polegato Moretti | |
| 2013/0232818 A1 | 9/2013 | Wiener | |
| 2013/0232825 A1* | 9/2013 | Wiener | A43B 23/07 36/3 B |
| 2015/0374070 A1 | 12/2015 | Tawney et al. | |
| 2016/0000187 A1 | 1/2016 | Chon et al. | |

FOREIGN PATENT DOCUMENTS

| | | |
|---|---|---|
| CN | 102573551 A | 7/2012 |
| EP | 3081110 A2 | 10/2016 |
| FR | 2825241 A1 | 12/2002 |
| JP | H08224110 A | 9/1996 |
| WO | 2008003375 A1 | 1/2008 |

* cited by examiner

ARTICLE OF FOOTWEAR AND METHOD OF MANUFACTURING AN ARTICLE OF FOOTWEAR

CROSS-REFERENCE TO RELATED APPLICATIONS

This application claims the benefit of priority to U.S. Provisional Application No. 62/678,252, filed May 30, 2018 which is incorporated by reference in its entirety.

TECHNICAL FIELD

The present teachings generally include an article of footwear and a method of manufacturing an article of footwear.

BACKGROUND

Traditionally, a strobel is secured to a footwear upper and then the upper and strobel are stretched on a last. A midsole is then bonded to the strobel with an adhesive while the upper and strobel are on the last.

DESCRIPTION

Figure 1:
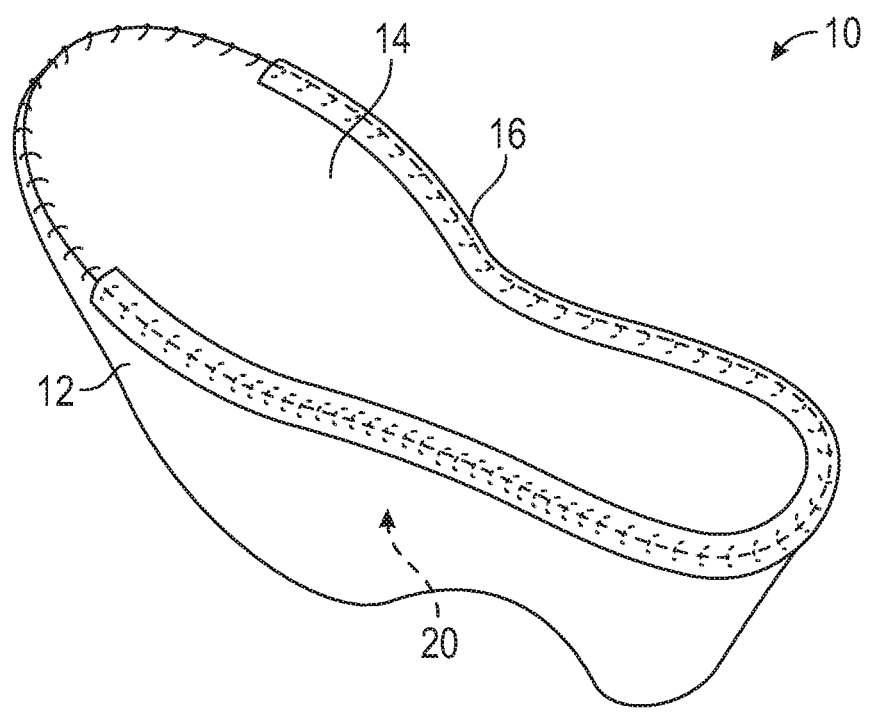
FIG. 1 is a schematic illustration in perspective view of a strobel stitched to an upper and a gasket sealing stitch holes.

An article of footwear is configured with an improvement especially useful with direct bottoming manufacturing by injection-molding midsoles to uppers. In a direct bottoming process, a midsole is directly formed on the bottom of the strobel and the upper, instead of being pre-formed and then attached with adhesive or thermal bonding. The article of footwear includes an upper and a strobel stitched to the upper at a series of stitches disposed in stitch holes that extend through the strobel. The strobel and the upper define a foot-receiving cavity with an inner surface of the strobel disposed at the foot-receiving cavity. A midsole is secured to the upper and an outer surface of the strobel is disposed at the midsole. The stitch holes are obstructed such that the stitch holes are not exposed to both the midsole and the foot-receiving cavity. When a flowable polymeric material, such as liquid polyurethane, is injected in a mold cavity to form the midsole with the lower portion of the upper and the strobel in the mold cavity, the stitch holes will not provide a path for entry of the flowable polymeric material into the foot-receiving cavity.

The following discussion focuses on liquid polyurethane as an example flowable polymeric material. However, any suitable flowable polymeric material may be used, such as one or more thermoplastic and/or crosslinkable polymers (e.g., polyurethanes, polyolefins, polyamides, combinations thereof, and the like). The terms "flowable" and "liquid" refer to the polymeric materials being in an injectable state, such as a molten state (e.g., for thermoplastic materials), in a pre-crosslinked state (e.g., for crosslinked materials), and the like. In some embodiments, the one or more polymers exhibit elastomeric properties in their solid and/or crosslinked states. Furthermore the flowable polymeric material may optionally include one or more additives, such as colorants, rheology modifiers, crosslinking agents, processing aids, and the like.

In one or more embodiments, the article of footwear is characterized by the absence of an insole. For example, the strobel may be configured to establish the foot-receiving surface in direct contact with a foot when the article of footwear is worn. The strobel may thus be especially configured to be worn without an insole. The strobel may be relatively thin and inelastic. For example, the strobel may be approximately one-fifth of the thickness of a traditional strobel.

In one or more embodiments, the strobel may include a first layer and a second layer. For example, the first layer may be a relatively soft textile. An inner surface of the first layer may be disposed at a foot-receiving cavity of the upper. An outer surface of the second layer may be disposed at the midsole. The second layer may be a material that inhibits a flowable polymeric material from penetrating the second layer. By obstructing the stitch holes, the function of the second layer in inhibiting entry of the flowable polymeric material is not diminished.

The stitch holes may be obstructed in a variety of ways. For example, in one or more embodiments, the article of footwear further includes a gasket secured to the outer surface of the strobel, extending over the stitch holes, and configured to seal the stitch holes. For example, the gasket may have an inner surface contacting the strobel and extending over the stitch holes. The gasket may include an adhesive on the inner surface of the gasket that secures the gasket to the strobel. In another alternative, the gasket may be thermally bonded to the strobel. The gasket prevents the flowable polymeric material from passing through the stitch holes during the direct bottoming process.

The gasket may be a flat, elongated strip of a material wide enough to cover the stitch holes, but narrower than the width of the strobel, so that a portion of the outer surface of the strobel is exposed to the flowable polymeric material and therefore in contact with the formed midsole. A medial portion of the gasket may extend over the stitch holes at a medial side of the strobel and a lateral portion of the gasket may extend over the stitch holes at a lateral side of the strobel. The outer surface of the strobel may be exposed to the midsole between the medial portion of the gasket and the lateral portion of the gasket.

In an aspect, the series of stitches may border the perimeter of the strobel in a forefoot region, a midfoot region, and a heel region of the strobel, and the gasket may extend over the stitches in the heel region and the midfoot region. In one or more embodiments, the gasket further extends in the forefoot region, and may extend around the entire perimeter. In one or more other embodiments, the gasket does not extend around the entire perimeter, and so does not obstruct all of the stitch holes. For example, the gasket may have a U-shaped heel portion, a medial arm portion extending forward from the U-shaped heel portion, and a lateral arm portion extending forward from the U-shaped heel portion. The medial arm portion and the lateral arm portion may terminate rearward of a foremost extent of the strobel. Accordingly, at least some of the stitch holes at which the strobel is stitched to the upper are forward of the medial arm portion and the lateral arm portion and are exposed at the outer surface of the strobel.

In one or more other embodiments, no gasket is used, as the orientation of the stitch holes is such that they are displaced from the foot-receiving cavity by the upper and the strobel (i.e., the upper and the strobel themselves obstruct the stitch holes). More specifically, the inner surface of the strobel abuts an inner surface of the upper along a periphery of the strobel to define a peripheral flange. The stitch holes extend through the peripheral flange from the outer surface of the strobel to the outer surface of the upper and are displaced from the foot-receiving cavity. For example, because the inner surfaces of the strobel and the upper are abutted to form the peripheral flange, the peripheral flange extends away from the foot-receiving cavity, and the stitch holes do not extend toward or into the peripheral cavity in order to extend through the peripheral flange.

A method of manufacturing an article of footwear comprises obstructing stitch holes that extend through a strobel. A series of stitches are disposed in the stitch holes and secure the strobel to an upper so that the strobel and the upper define a foot-receiving cavity. The method further comprises injecting a flowable polymeric material into a mold cavity configured as a midsole mold such that the a flowable polymeric material contacts an outer surface of the strobel. Obstructing the stitch holes inhibits the flowable polymeric material from passing through the strobel to the foot-receiving cavity via the stitch holes.

The method may include stitching the strobel to the upper to establish the series of stitches and the stitch holes. For example, the strobel may be positioned adjacent to the upper so that the strobel and the upper define the foot-receiving cavity with a first layer of the strobel disposed at the foot-receiving cavity of the upper and a second layer of the strobel is exposed. Alternatively, prior to stitching the strobel to the upper, the method may comprise abutting an inner surface of the strobel to an inner surface of the upper along a periphery of the strobel to define a peripheral flange, and then the stitching results in the stitch holes extending through the peripheral flange from the outer surface of the strobel to the outer surface of the upper so that the stich holes are displaced from the foot-receiving cavity In one or more embodiments, obstructing the stitch holes may be by securing a gasket to the outer surface of the strobel over the stitch holes. In one or more embodiments, securing the gasket to the strobel is by adhering the gasket to the strobel. Alternatively, securing the gasket to the strobel may be by thermally bonding the gasket to the strobel. The gasket seals those stitch holes over which it extends.

The method may further comprise inserting a last in a foot-receiving cavity formed by the upper and the strobel prior to injecting the flowable polymeric material. While the last is inserted in the foot-receiving cavity, the method may include disposing a lower portion of the upper and the strobel in a mold cavity configured as a midsole mold. The method may include solidifying the flowable polymeric material in the mold cavity so that a midsole is secured to the upper and covers the gasket in embodiments that have a gasket, and covers the peripheral flange in embodiments that have a peripheral flange. The upper and the strobel with the midsole secured thereto may then be withdrawn from the mold cavity.

The above features and advantages and other features and advantages of the present teachings are readily apparent from the following detailed description of the modes for carrying out the present teachings when taken in connection with the accompanying drawings.

Referring to the drawings wherein like reference numbers refer to like components throughout the views, FIG. 1 shows a portion of an article of footwear 10 that includes an upper 12, a strobel 14 stitched to the upper 12, and a gasket 16. The article of footwear 10 also includes a midsole 18, shown in FIG. 12, that is secured to the strobel 14 and the upper 12 over the gasket 16 in a direct bottoming manufacturing process discussed herein.

Figure 3:
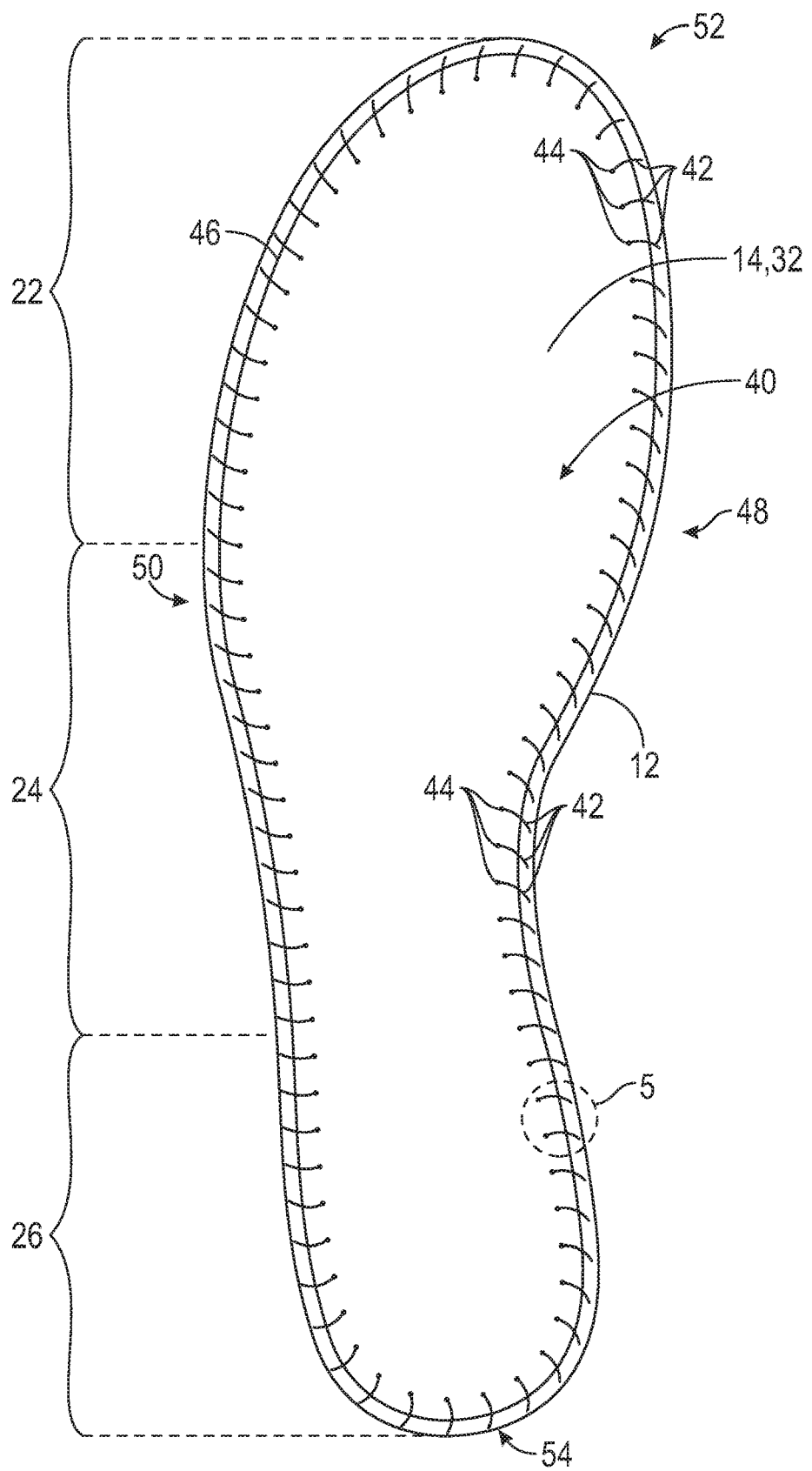
FIG. 3 is a schematic illustration in bottom view of the upper and strobel of FIG. 1.

The upper 12 and the strobel 14 together define a foot-receiving cavity 20 that is configured to receive and retain a foot so that the foot is supported on the strobel 14 and the midsole 18 which are positioned below the foot and between the foot and the ground during normal wear. As best shown in FIG. 3, the upper 12 and the strobel 14 both include and extend in a forefoot region 22, a midfoot region 24, and a heel region 26 of the article of footwear 10. The midfoot region 24 is between the heel region 26 and the forefoot region 22. As is understood by those skilled in the art, the forefoot region 22 generally underlies the toes and metatarsal-phalangeal joints of an overlying foot disposed in the foot-receiving cavity 20, the midfoot region 24 generally underlies the arch region of the foot, and the heel region 26 generally underlies the calcaneus bone of the foot. The position of a foot (not shown) is best represented by the footwear last 19 of FIG. 12. The footwear last 19 is shaped and sized to be representative of a foot having the specific footwear size for which the article of footwear is dimensioned.

Figure 8:
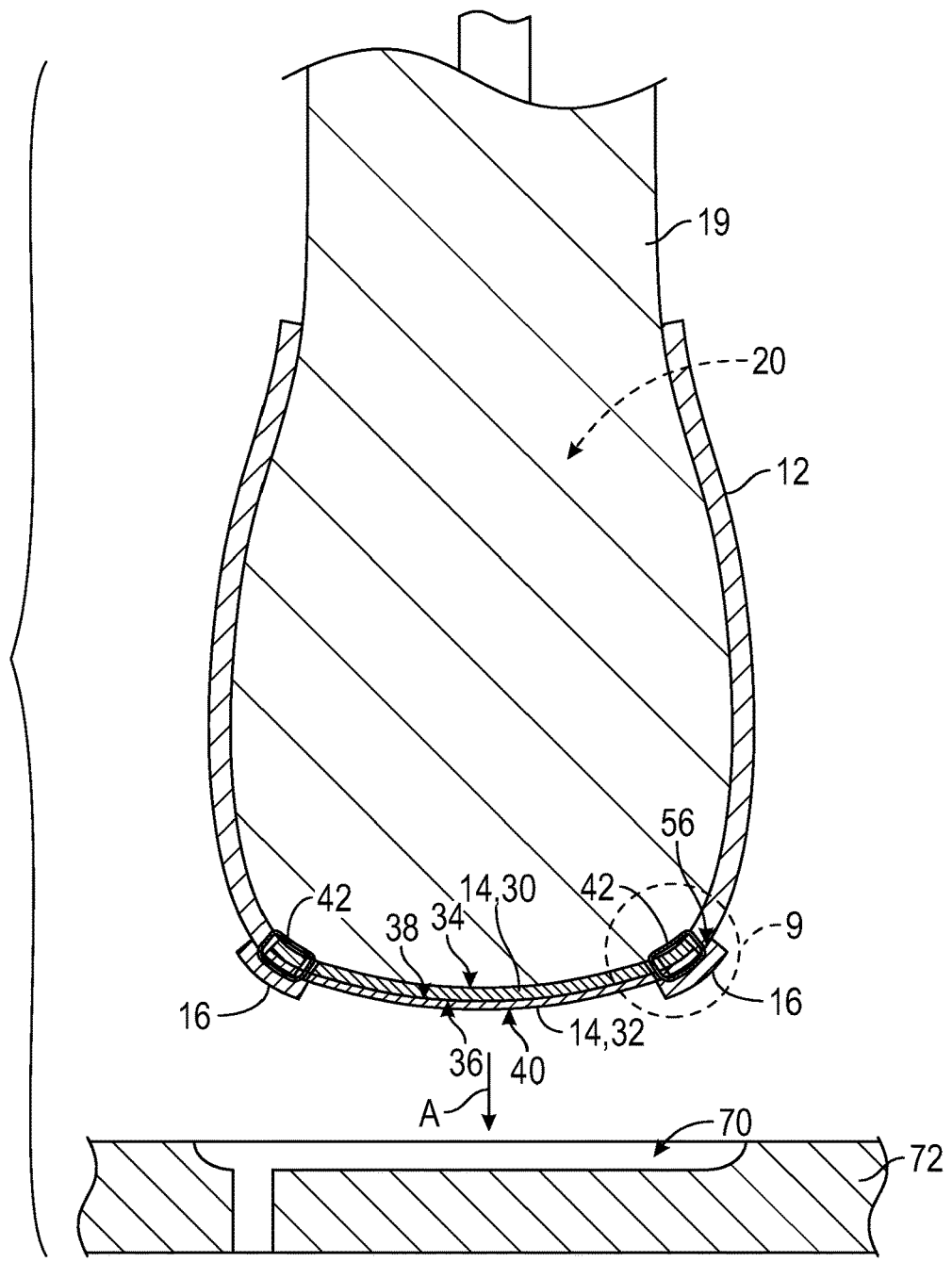
FIG. 8 is a schematic illustration in cross-sectional view of the upper, the strobel, and the gasket on the last of FIG. 2 moving toward a portion of a mold assembly.

Referring to FIG. 8, the strobel 14 is specifically configured for a direct bottoming manufacturing process. The strobel 14 is relatively, thin, soft, and inelastic. For example, the strobel 14 may be approximately one-fifth of the thickness of a traditional strobel, which may enhance its comfortable feel. The strobel 14 includes a first layer 30 and a second layer 32. When the strobel 14 is secured to the upper 12, an inner surface 34 of the first layer 30 is disposed at and defines the extremity of the foot-receiving cavity 20 which is completely filled by the last 19 in FIG. 8.

The first layer 30 may be a relatively thin, soft textile material that is thinner and softer than, for example, the textile material of a traditional strobel. The inner surface 34 may also be referred to as the foot-receiving surface as it is in direct contact with a foot (or a sock, if any is worn on the foot) when the article of footwear 10 is worn, as the article of footwear 10 is characterized by the absence of an insole. Stated differently, the first layer 30 is specifically selected to be soft for comfort during wear as the article of footwear 10 is configured to be worn without an insole.

Figure 9:
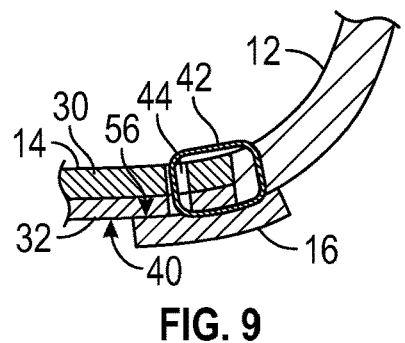
FIG. 9 is a schematic illustration in partial fragmentary view of the upper, the strobel, and the gasket of FIG. 8.
Figure 11:
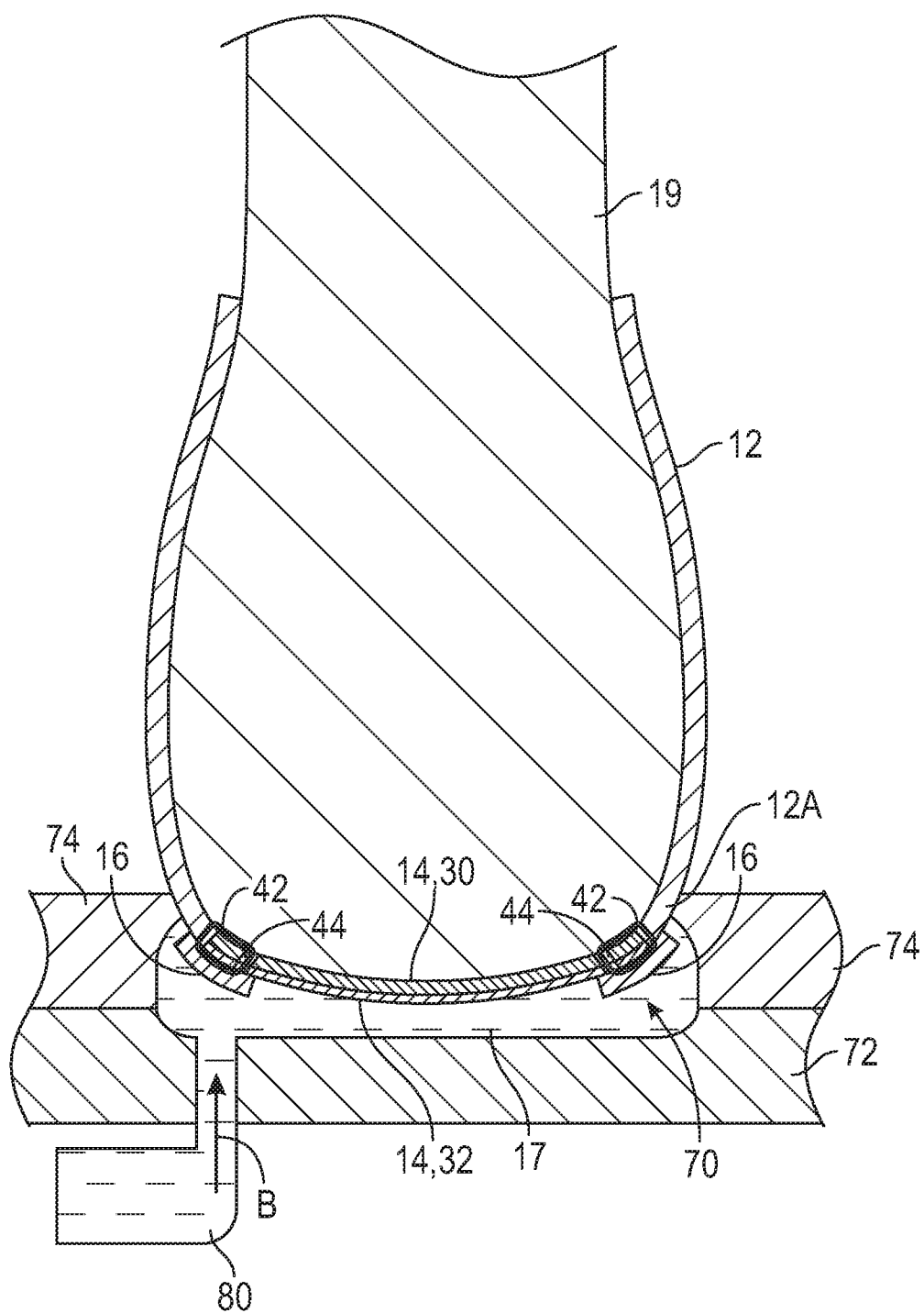
FIG. 11 is a schematic illustration in cross-sectional view of the upper, the strobel, and the gasket in the closed mold assembly with a flowable polymeric material (e.g., liquid polyurethane) injected into a cavity of the mold assembly.

With continued reference to FIG. 9, an outer surface 36 of the first layer 30 is secured to an inner surface 38 of the second layer 32, such as by adhesive bonding or thermal bonding. As shown in FIG. 11, an outer surface 40 of the second layer 32 is exposed to the flowable polymeric material 17 in liquid form that is used to form the midsole 18, as described herein. Accordingly, the second layer 32 is a material specifically selected for its ability to inhibit or entirely prevent the flowable polymeric material 17 from penetrating the second layer 32. For example, the second layer 32 may be a relatively thin polymeric film that functions as a barrier film with respect to the flowable polymeric material 17.

Referring to FIGS. 3-6, the strobel 14 is stitched to the upper 12 at a series of stitches 42 that extend through stitch holes 44 in the strobel 14. The stitches 42 may be, for example, a portion of a continuous, elongated thread. The stitch holes 44 extend completely through the strobel 14 (i.e., through both the first layer 30 and the second layer 32 from the outer surface 40 to the inner surface 34), and also extend through the upper 12 along a lower periphery of the upper 12. The stitch holes 44 are made by a needle during the stitching process. The series of stitches 42 and the respective stitch holes 44 of the stitches border the perimeter 46 of the strobel 14 in the forefoot region 22, the midfoot region 24, and the heel region 26 along both a medial side 48 and a lateral side 50 of the strobel 14, around the foremost extent 52 of the forefoot region 22, and around the rearmost extent 54 of the heel region 26. The stitch holes 44 are obstructed such that the stitch holes 44 are not exposed to both the midsole 18 and the foot-receiving cavity 20. If the stitch holes 44 were to be exposed to the flowable polymeric material 17 used to form the midsole 18, they would provide a direct route for the flowable polymeric material to pass through the strobel 14 onto, for example, the inner surface 34 of the first layer 30. This may not be aesthetically pleasing given that no insole covers the inner surface 34.

Figure 4:
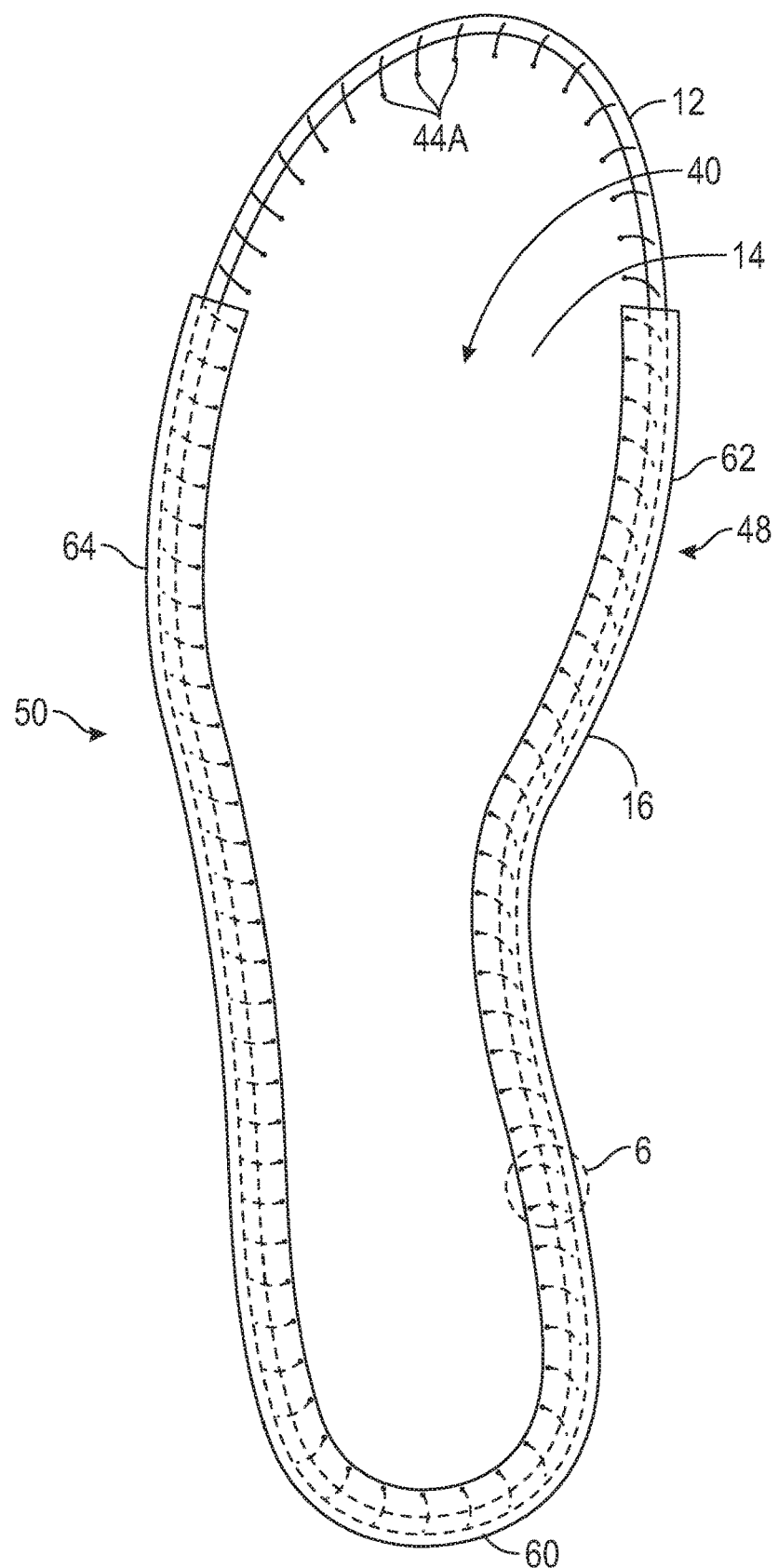
FIG. 4 is a schematic illustration in bottom view of the upper, the strobel, and the gasket of FIG. 1.
Figure 5:
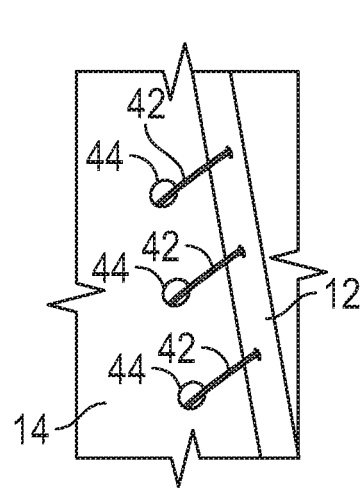
FIG. 5 is a schematic fragmentary view of the upper and strobel of FIG. 3.
Figure 6:
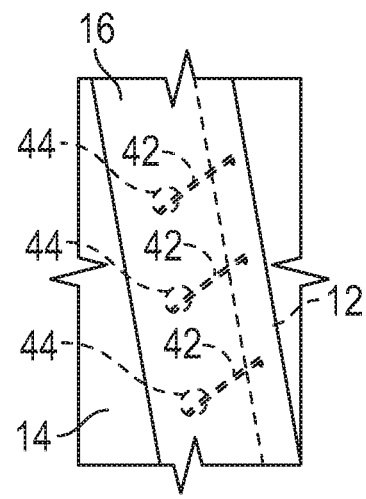
FIG. 6 is a schematic fragmentary view of the upper, the strobel and the gasket of FIG. 4.

One way to obstruct the stitch holes 44 in order to avoid such a leakage route is to provide the gasket 16 that is configured to cover and seal at least some of the stitch holes 44, so that the function of the second layer 32 in inhibiting entry of the flowable polymeric material 17 is not diminished. The gasket 16 is secured to the outer surface 40 of the strobel 14 over at least some of the stitch holes 44 as best shown in FIGS. 4 and 6. The gasket 16 may be thermally bonded to the strobel 14. Alternatively, the gasket 16 may be self-adhering. For example, the inner surface 56 of the gasket 16 contacts the outer surface 40 of the second layer 32 of the strobel 14 over the stitch holes 44, and the gasket 16 includes an adhesive on the inner surface 56 so that the inner surface 56 adheres to the strobel 14. Like the second layer 32, the gasket 16 is configured of a material impenetrable to a flowable polymeric material 17 so that it inhibits or entirely prevents the a flowable polymeric material 17 from passing through the gasket 16.

Figure 2:
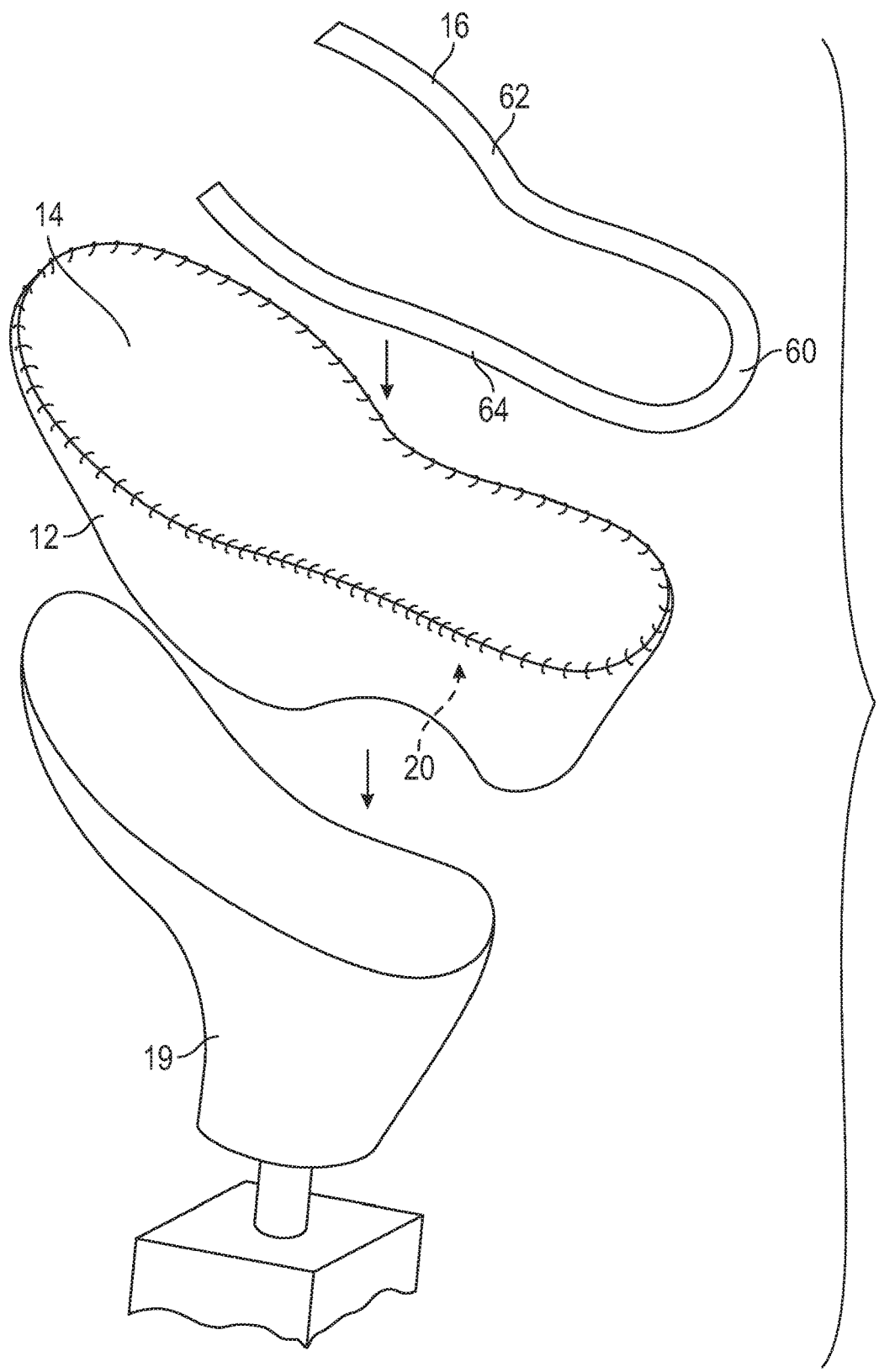
FIG. 2 is a schematic illustration in exploded view of the upper, strobel, and gasket of FIG. 1 and a footwear last.

As best shown in FIG. 2, the gasket 16 is a flat, elongated strip and is wide enough to cover the stitch holes 44 and may also be wide enough to cover a portion of the lower extent of the upper 12 where the stitches 42 enter through the upper 12, as shown in FIGS. 6 and 9. Referring to FIG. 2, the gasket 16 has a U-shaped heel portion 60, a medial arm portion 62 (also referred to as a medial portion) extending forward from the U-shaped heel portion 60, and a lateral arm portion 64 (also referred to as a lateral portion) extending forward from the U-shaped heel portion 60. The U-shaped heel portion 60 extends in the heel region 26, and the medial and lateral arm portions 62, 64 extend in the midfoot region 24 and in a rear portion of the forefoot region 22.

The gasket 16 is much narrower than the width of the strobel 14 from the medial side 48 of its perimeter 46 to the lateral side 50 of its perimeter 46. The medial arm portion 62 extends over the stitch holes 44 at the medial side 48 of the strobel 14, and the lateral arm portion 64 extends over the stitch holes 44 at the lateral side 50 of the strobel 14. In the embodiment shown, the gasket 16 does not obstruct all of the stitch holes 44, however, as the gasket 16 does not extend around the entire perimeter 46. The medial arm portion and the lateral arm portion 62, 64 terminate rearward of the foremost extent of the strobel 14, so that a some of the stitch holes 44 (i.e., as sub-set of the stitch holes 44) forward of the medial arm portion and the lateral arm portion 62, 64 are exposed at the outer surface 40 of the strobel 14 before the midsole 18 is secured to the strobel 14, as shown in FIG. 4. The stitch holes of the exposed sub-set are indicated with reference number 44A in FIG. 4. Although the flowable polymeric material 17 may extend through these stitch holes 44A during the direct bottoming process, the inner surface 34 of the strobel at this forward extent of the forefoot region 22 may be difficult to view within the foot-receiving cavity 20, and the aesthetic qualities of the footwear 10 will thus not be diminished.

Figure 7:
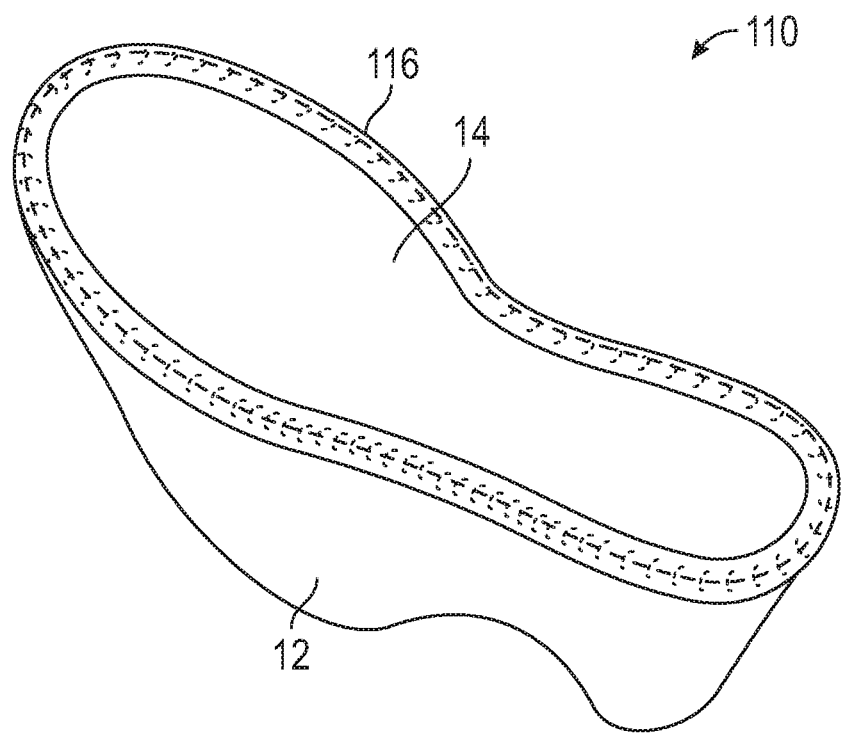
FIG. 7 is a schematic illustration in perspective view of a strobel stitched to an upper and a gasket sealing stitch holes in accordance with an alternative aspect of the present teachings.

FIG. 7 shows an alternative embodiment of an article of footwear 110, alike in all aspects to the article of footwear 10, except that the gasket 16 is replaced by a gasket 116 identical to gasket 16 except that it extends around the entire perimeter 46 of the strobel 14 and covers all of the stitch holes 44.

Figure 12:
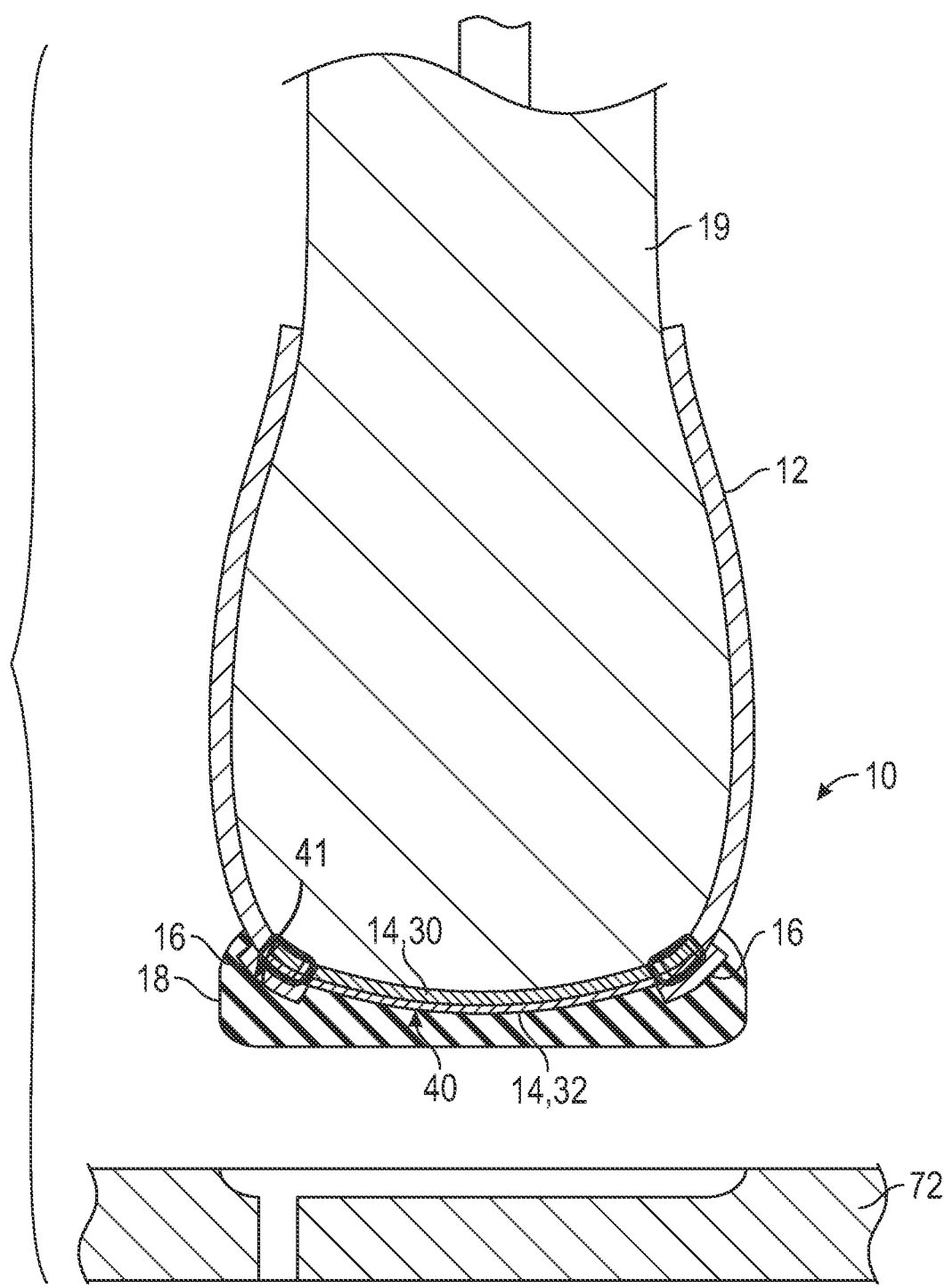
FIG. 12 is a schematic illustration in cross-sectional view of the upper, the strobel, and the gasket with a midsole secured thereto and withdrawn from the open mold assembly.

Whether the gasket 16 or the gasket 116 is used, FIGS. 1 and 7 show that a portion of the outer surface 40 of the strobel 14 is exposed between the gasket 16 or 116 at the medial side 48 and at the lateral side 50, such as between the medial arm portion 62 and the lateral arm portion 64. As best shown in FIG. 12, this portion of the outer surface 40 is thus exposed to the flowable polymeric material 17 during the direct bottoming manufacturing process disclosed herein, and interfaces with the solidified midsole 18 which bonds to the upper 12 around the strobel 14. The bonding may occur by heat bonding (i.e., thermal bonding) during the manufacturing process described herein.

Figure 14:
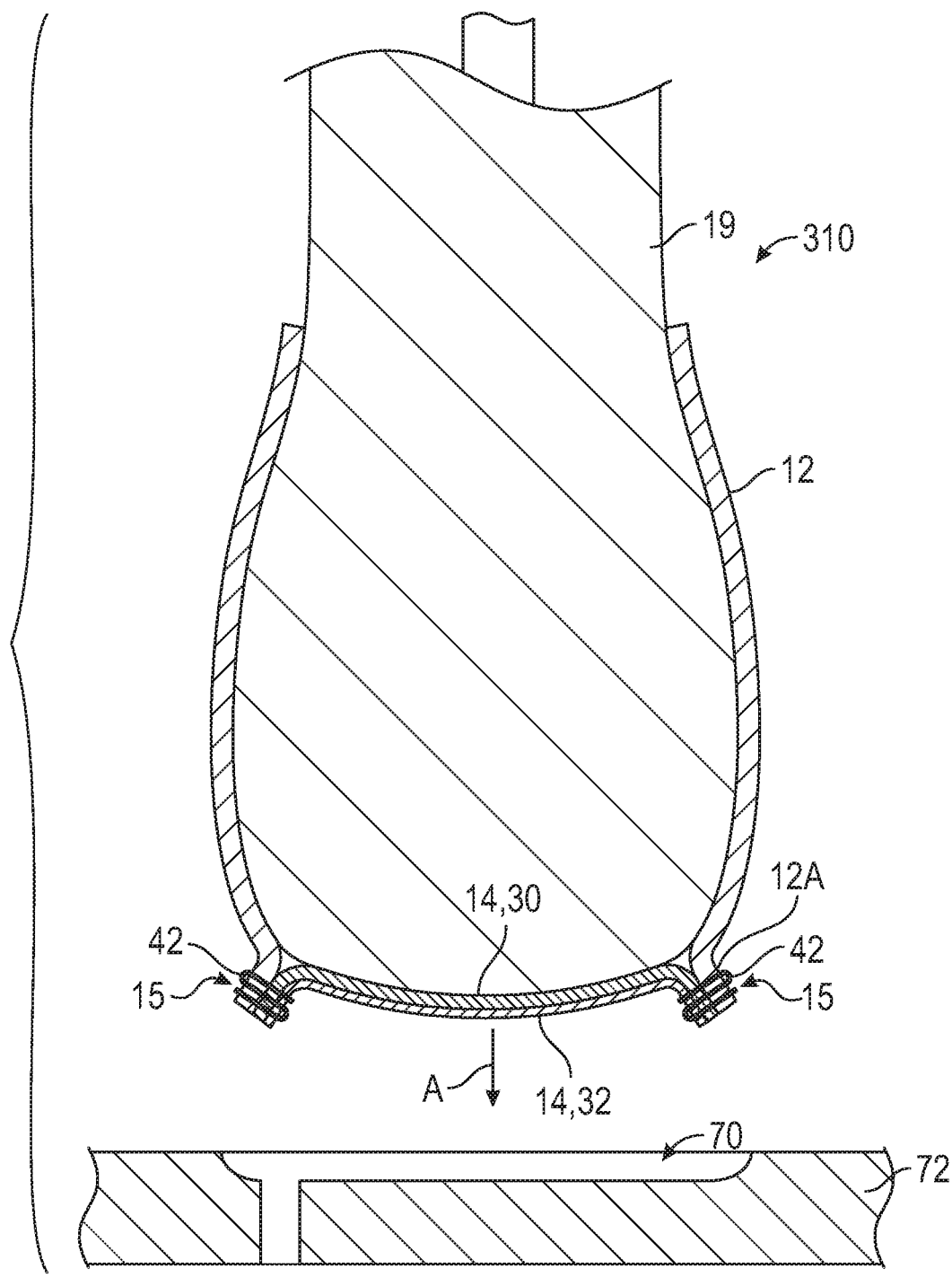
FIG. 14 is a schematic illustration in cross-sectional view of an alternative embodiment of an upper stitched to a strobel on the last of FIG. 2 moving toward a portion of a mold assembly.
Figure 15:
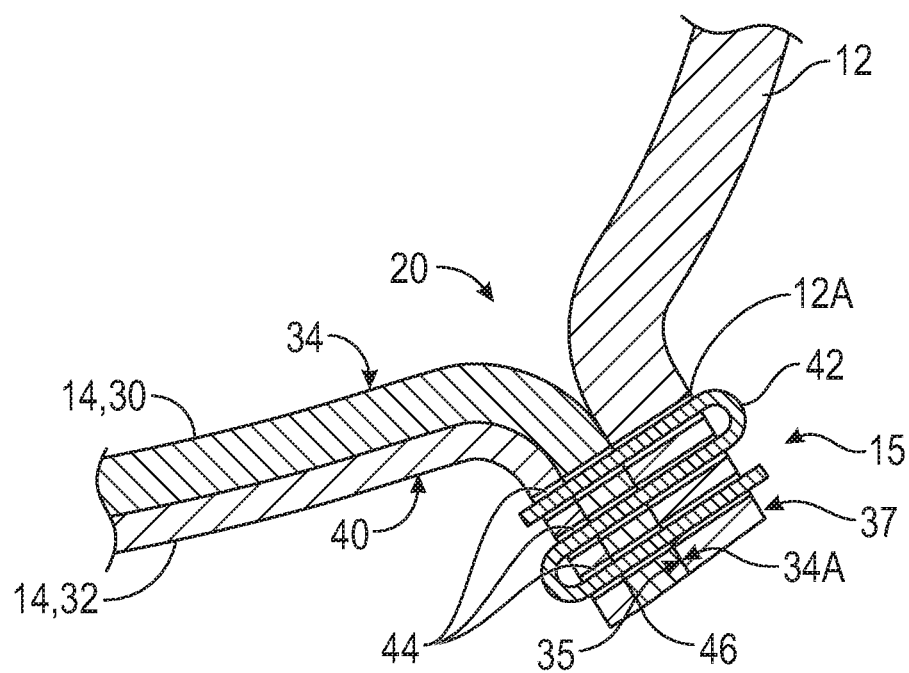
FIG. 15 is a schematic illustration in partial fragmentary view of the upper and the strobel of FIG. 14.
Figure 16:
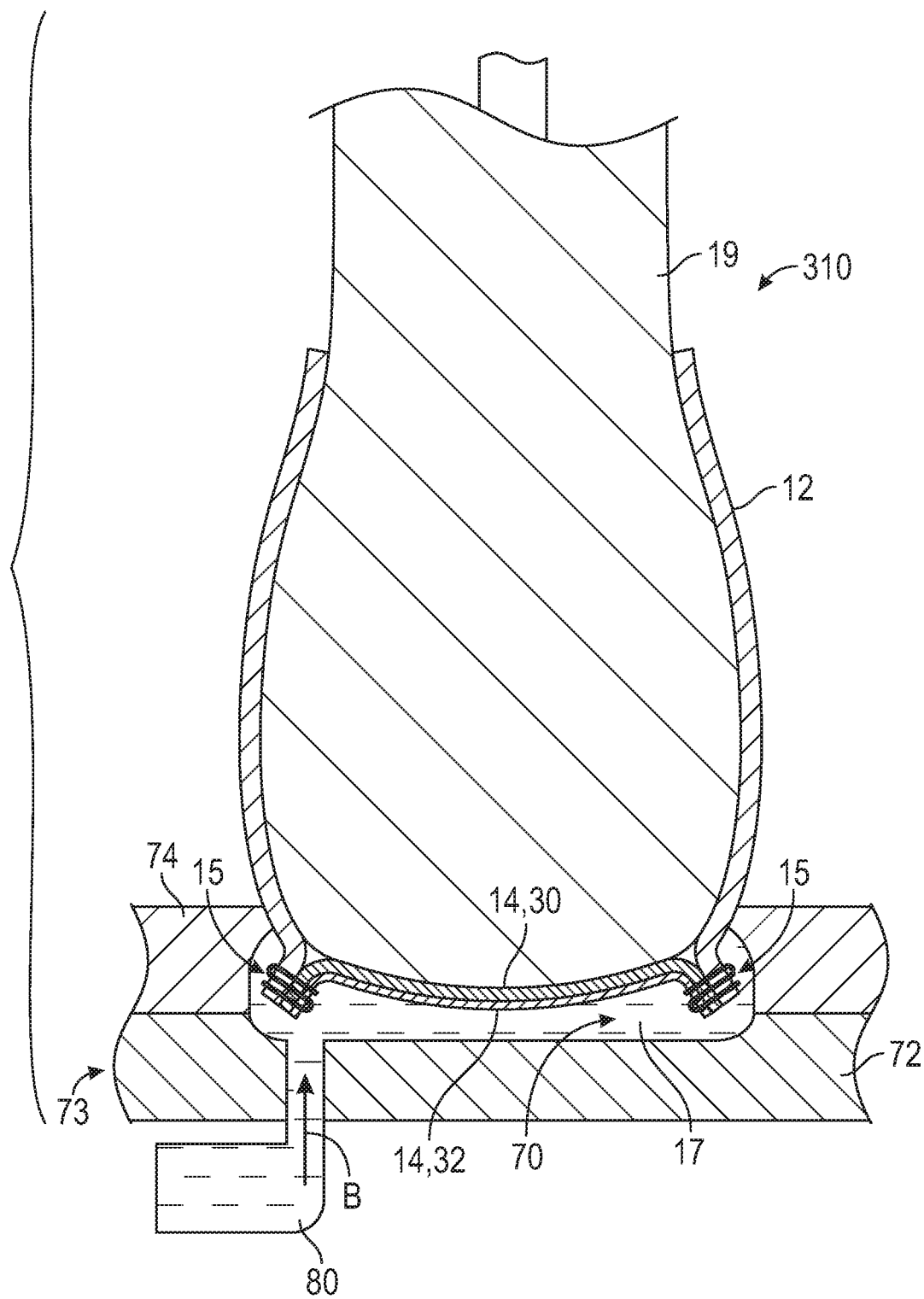
FIG. 16 is a schematic illustration in cross-sectional view of the upper and the strobel of FIG. 14 in the closed mold assembly with the flowable polymeric material injected into a cavity of the mold assembly.

FIGS. 14-17 show another embodiment of a strobel 14 stitched to an upper 12 and disposed on a last 19. In this embodiment, a peripheral portion 34A of the inner surface 34 of the strobel 14 abuts the inner surface 35 of the upper at or near the perimeter 46 of the strobel 14 and a lower portion 12A of the upper 12. The stitches 42 extend through the abutting portions of the strobel 14 and the upper 12 to form a peripheral flange 15. As best shown in FIG. 15, the stitch holes 44 extend from the outer surface 40 of the strobel 14 to the outer surface 37 of the upper 12 through the peripheral flange 15. Due to the peripheral flange 15, the stitch holes 44 are oriented so that they do not extend toward or into the foot-receiving cavity 20 and thus do not create a path for the flowable polymeric material 17 to reach the inner surface 34 of the first layer 30 at the foot-receiving cavity 20 during manufacturing. Stated differently, due to the abutting inner surfaces 34, 35 of the strobel 14 and the lower portion 12A of the upper 12, the peripheral flange 15 extends away from the foot-receiving cavity 20, not into the foot-receiving cavity 20. Accordingly, no gasket 16 or 116 is needed in this embodiment. As shown in FIG. 16, when the midsole 18 is solidified, the peripheral flange 15 is covered by the midsole 18.

Figure 13:
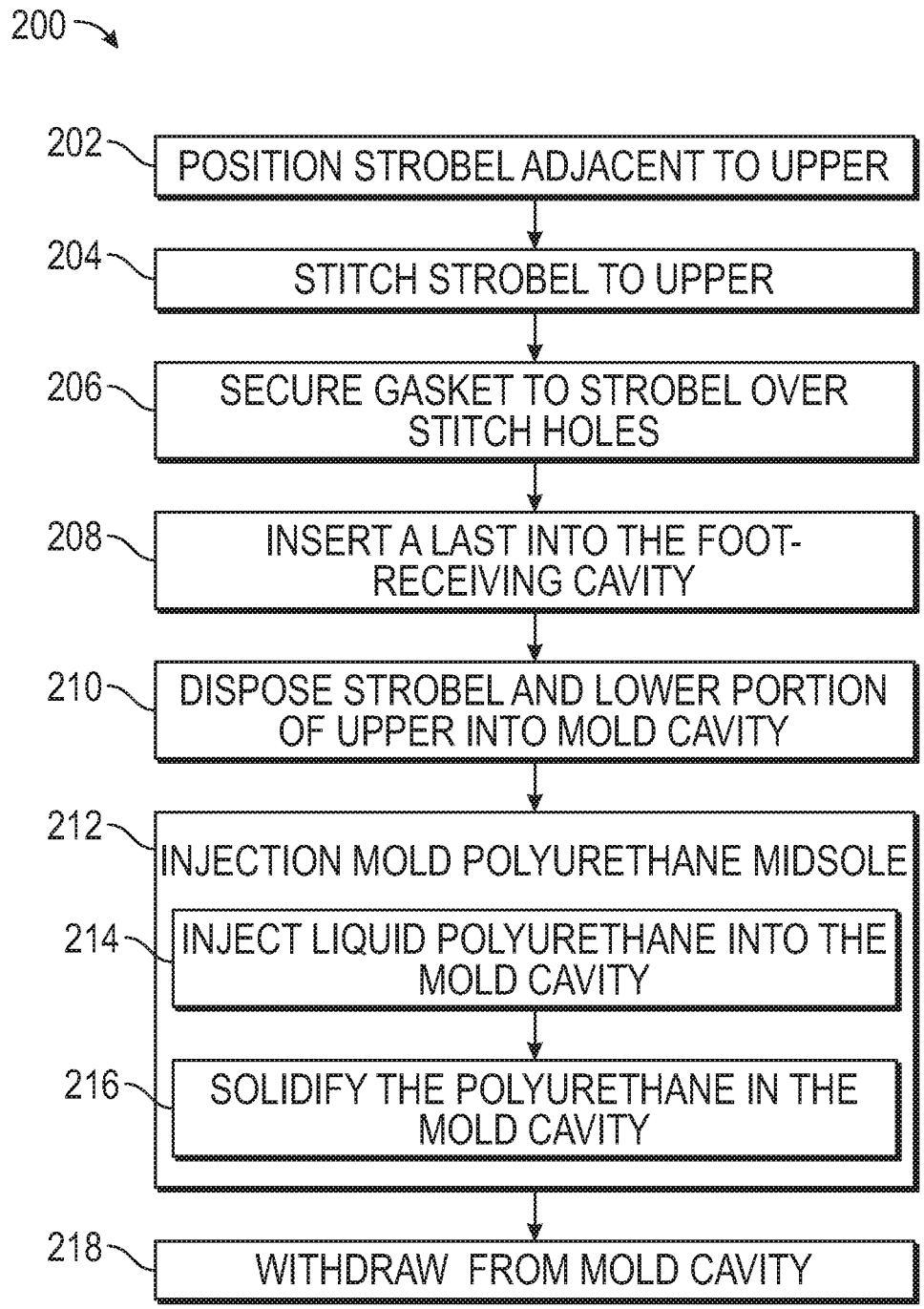
FIG. 13 is a flow diagram of a method of manufacturing an article of footwear.

FIGS. 8-12 illustrate the steps of a method 200 of manufacturing an article of footwear such as article of footwear 10, 110, or 310. The steps of the method 200 are listed in the flow diagram of FIG. 13. The method 200 begins with step 202, positioning the strobel 14 adjacent to the upper 12 so that the first layer 30 of the strobel 14 is disposed at the foot-receiving cavity 20 of the upper 12, and the second layer 32 of the strobel 14 is exposed (i.e., at an exterior of the connected upper 12 and strobel 14). The strobel 14 is subsequently stitched to the upper 12 in step 204. In step 204, the strobel 14 is stitched to the upper 12 at a series of stitches 42 that secure the strobel 14 to the upper 12. The stitches 42 secure the strobel 14 to the upper 12 but create stitch holes 44 in the strobel 14.

In the manufacturing of the article of footwear 310, step 204 results in the obstructing of the stitch holes 44 to inhibit the flowable polymeric material 17 from passing through the strobel 14 to the foot-receiving cavity 20 via the stitch holes 44 during step 212 and specifically sub-step 214. In the manufacturing of the article of footwear 10 or 110, obstructing the stitch holes 44 includes both step 204 and step 206 in which the gasket 16 or 116 is secured to the strobel 14 over the series of stitches 42 so that the gasket seals at least some of the stitch holes 44 in the strobel 14 as shown in FIGS. 1 and 7. Non-limiting examples of ways by which the gasket 16 or 116 may be secured to the strobel include adhering the gasket 16 or 116 to the strobel 14, or thermally bonding the gasket 16 or 116 to the strobel 14. Step 206 is skipped in the manufacturing of the article of footwear 310.

With the strobel 14 secured to the upper 12 and the gasket 16 or 116 secured over at least some of the stitch holes 44 in the article of footwear 10 or 110, the upper 12 and the strobel 14 are ready to be lasted in step 208 by inserting a last 19 in the foot-receiving cavity 20 formed by the upper 12 and the strobel 14 as shown in FIGS. 8 and 14. The upper 12 and strobel 14 may be adjusted to a predetermined position on the last 19, such as may be indicated by alignment features on the strobel 14 aligning with markings on the last 19.

Figure 10:
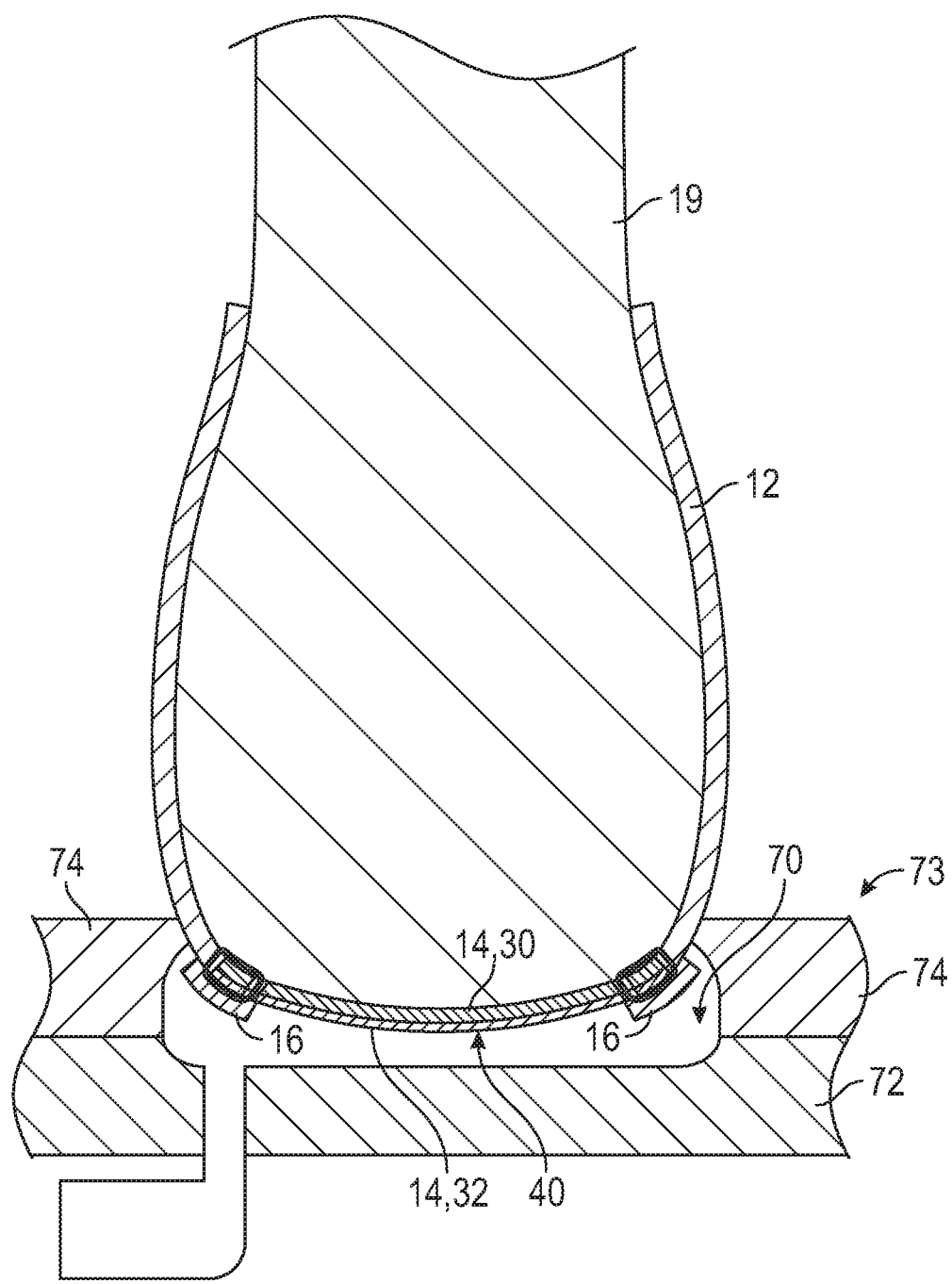
FIG. 10 is a schematic illustration in cross-sectional view of the upper, the strobel, and the gasket on the last of FIG. 8 in the closed mold assembly.

With the last 19 inserted in the foot-receiving cavity 20, the method 200 proceeds to step 210, disposing a lower portion 12A of the upper 12 and the strobel 14 into a mold cavity 70 formed in part by a first mold portion 72 of a mold assembly 73. Step 210 is illustrated in FIGS. 8, 10, 14 and 16. In FIGS. 8 and 14, the last 19 with the upper 12 and strobel 14 thereon are moved toward the mold cavity 70 as indicated by arrow A. Once the last 19 is sufficiently moved toward the mold cavity 70 so that a lower extent of the upper 12 and the strobel 14 extend into the mold cavity 70, the mold assembly 73 is closed such as by moving a second mold portion 74 into place around the upper 12 and last 19 at the mold cavity 70 to further define the mold cavity 70 as shown in FIGS. 10 and 16. The mold cavity 70 is configured in the shape of the midsole 18, and may be referred to as a midsole mold. The gasket 16, 116 and the peripheral flange 15 are disposed in the mold cavity via step 210.

Next, in step 212, the midsole 18 is injection molded so that it will secure to the upper 12 and the strobel 14 over the gasket 16 or 116 or the peripheral flange 15. Step 212 includes sub-step 214, injecting a flowable polymeric material 17 in liquid form into the mold cavity 70. This is referred to as a direct bottoming process, as the midsole 18 is directly formed from a flowable polymeric material 17 on the bottom of the strobel 14 and the upper 12, instead of being preformed and then attached with adhesive or by thermal processes. FIGS. 11 and 16 shows the a flowable polymeric material 17 directed into the mold cavity 70 from a supply 80 of the flowable polymeric material, as indicated by arrow B, such as by pumping the flowable polymeric material 17. The gasket 16, 116 secured over the stitch holes 44 or the peripheral flange 15 is exposed to the flowable polymeric material 17 in the mold cavity 70 and prevents flowable polymeric material injection-molded in the mold cavity 70 for the midsole 18 from entering the stitch holes 44 during the direct bottoming process.

Step 212 also includes sub-step 216, solidifying the flowable polymeric material in the mold cavity 70 so that the polymeric material is formed as the midsole 18 secured to the upper 12 and the strobel 14 and covering over the gasket 16 or 116 or the peripheral flange 15. The gasket 16 is between the outer surface 40 of the strobel 14 and an inner surface 41 of the midsole 18, as shown in FIG. 12. Solidifying the flowable polymeric material in sub-step 216 may include waiting a predetermined time period for the liquid flowable polymeric material 17 to solidify, and may also include controlling and/or monitoring the temperature of the polymeric material in the mold cavity 70.

Figure 17:
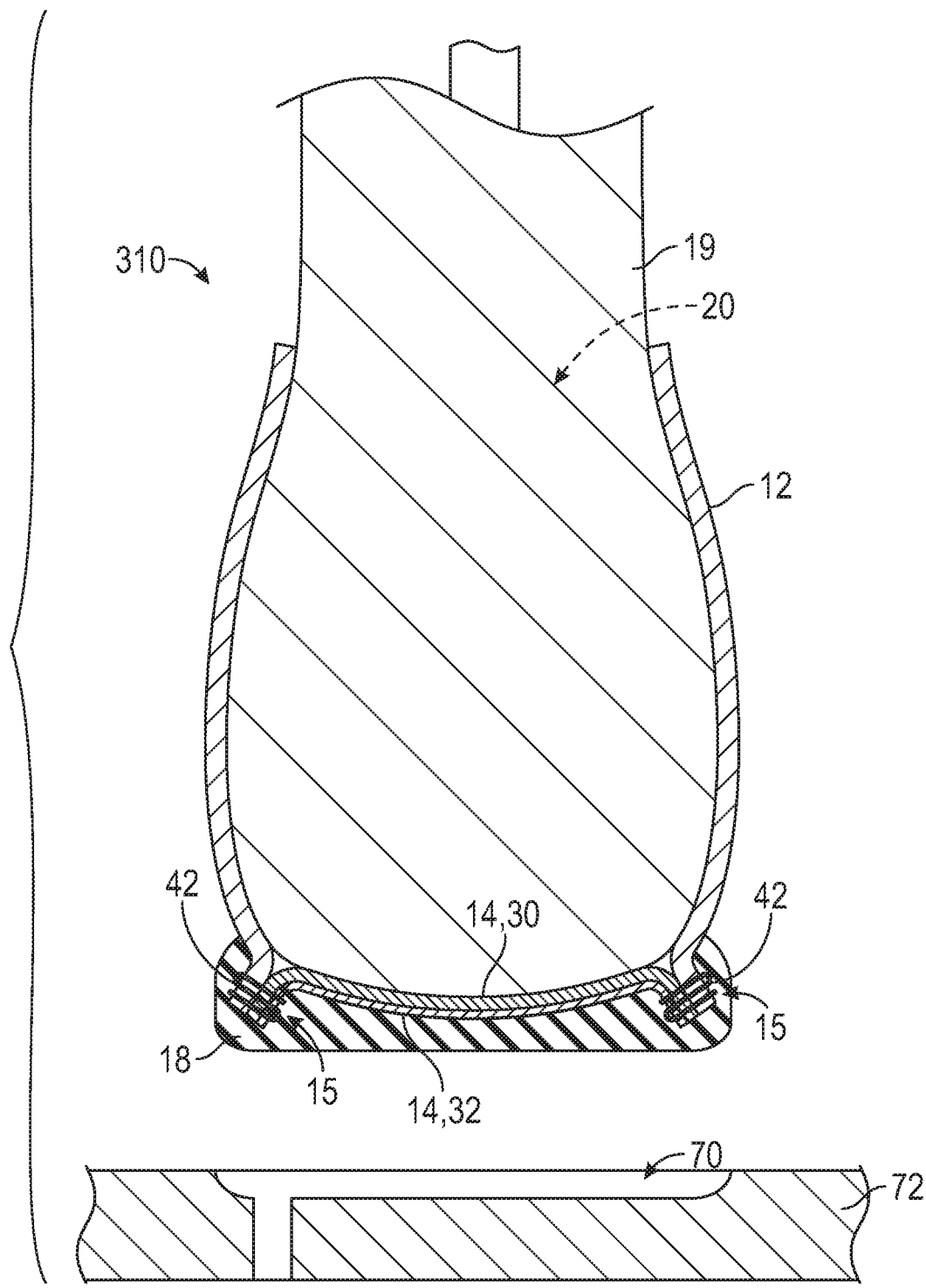
FIG. 17 is a schematic illustration in cross-sectional view of the upper and the strobel of FIG. 14 with a midsole secured thereto and withdrawn from the open mold assembly.

Next, the method 200 moves to step 218, in which the lower extent of the upper 12, the strobel 14 with the gasket 16 or 116 or the peripheral flange 15 and the midsole 18 secured thereto are withdrawn from the mold cavity 70 as illustrated in FIGS. 12 and 17. Step 218 may include the sub-steps of opening the mold assembly 73 and moving the last 19 away from the mold assembly 73. The article of footwear 10, 110, or 310 may then be removed from the last 19. Additional steps such as securing an outsole or discrete outsole elements to the midsole 18 may be carried out after step 218, either while the article of footwear 10, 110, or 310 is on the last 19 or after the article of footwear is removed from the last 19.

The following Clauses provide example configurations of an article of footwear and a method of manufacturing an article of footwear disclosed herein.

Clause 1: An article of footwear comprising: an upper; a strobel stitched to the upper at a series of stitches disposed in stitch holes that extend through the strobel; wherein the strobel and the upper define a foot-receiving cavity with an inner surface of the strobel disposed at the foot-receiving cavity; and a midsole secured to the upper and with an outer surface of the strobel disposed at the midsole; wherein the stitch holes are obstructed such that the stitch holes are not exposed to both the midsole and the foot-receiving cavity.

Clause 2: The article of footwear of clause 1, wherein: the strobel includes a first layer and a second layer; the first layer includes the inner surface disposed at the foot-receiving cavity; the second layer includes the outer surface disposed at the midsole; and the second layer comprises a material that inhibits a flowable polymeric material from penetrating the second layer.

Clause 3: The article of footwear of clause 2, wherein the first layer is a textile.

Clause 4: The article of footwear of any of clauses 1-3, wherein the article of footwear is characterized by the absence of an insole.

Clause 5: The article of footwear of clause 1, further comprising: a gasket secured to the outer surface of the strobel, extending over the stitch holes, and configured to seal the stitch holes.

Clause 6: The article of footwear of clause 5, wherein: the series of stitches borders a perimeter of the strobel in a forefoot region, a midfoot region, and a heel region of the strobel; and the gasket extends over stitch holes in the heel region and the midfoot region.

Clause 7: The article of footwear of clause 6, wherein the gasket further extends over stitch holes in the forefoot region.

Clause 8: The article of footwear of clause 6, wherein a medial portion of the gasket extends over the stitch holes at a medial side of the strobel and a lateral portion of the gasket extends over the stitch holes at a lateral side of the strobel.

Clause 9: The article of footwear of clause 8, wherein the outer surface of the strobel is exposed to the midsole between the medial portion of the gasket and the lateral portion of the gasket.

Clause 10: The article of footwear of any of clauses 5-9, wherein: the gasket has an inner surface contacting the strobel and extending over the stitch holes; and the gasket includes an adhesive on the inner surface of the gasket.

Clause 11: The article of footwear of clause 5, wherein: the gasket is a flat, elongated strip with a U-shaped heel portion, a medial arm portion extending forward from the U-shaped heel portion, and a lateral arm portion extending forward from the U-shaped heel portion; the medial arm portion and the lateral arm portion terminate rearward of a foremost extent of the strobel; and at least some of stitch holes at which the strobel is stitched to the upper are forward of the medial arm portion and the lateral arm portion and are exposed to the midsole at the outer surface of the strobel.

Clause 12: The article of footwear of clause 1, wherein: the inner surface of the strobel abuts an inner surface of the upper along a periphery of the strobel to define a peripheral flange; and the stitch holes extend through the peripheral flange from the outer surface of the strobel to the outer surface of the upper and are displaced from the foot-receiving cavity.

Clause 13: A method of manufacturing an article of footwear comprising: obstructing stitch holes that extend through a strobel; wherein a series of stitches are disposed in the stitch holes and secure the strobel to an upper so that the strobel and the upper define a foot-receiving cavity; and injecting a flowable polymeric material into a mold cavity configured as a midsole mold such that the flowable polymeric material contacts an outer surface of the strobel; wherein the obstructing the stitch holes inhibits the flowable polymeric material from passing through the strobel to the foot-receiving cavity via the stitch holes.

Clause 14: The method of clause 13, wherein obstructing the stitch holes is by securing a gasket to the outer surface of the strobel over the stitch holes.

Clause 15: The method of clause 14, wherein securing the gasket to the outer surface of the strobel is by adhering the gasket to the strobel or by thermally bonding the gasket to the outer surface of the strobel.

Clause 16: The method of clause 13, further comprising: stitching the strobel to the upper to establish the series of stitches and the stitch holes.

Clause 17: The method of clause 16, further comprising: prior to stitching the strobel to the upper, abutting an inner surface of the strobel to an inner surface of the upper along a periphery of the strobel to define a peripheral flange; and wherein the stitch holes extend through the peripheral flange from the outer surface of the strobel to the outer surface of the upper and are displaced from the foot-receiving cavity.

Clause 18: The method of clause 16, wherein the strobel includes a first layer and a second layer, the second layer comprises a material that inhibits the flowable polymeric material from penetrating the second layer, and the method further comprising: prior to stitching the strobel to the upper, positioning the strobel adjacent to the upper so that the strobel and the upper define the foot-receiving cavity with the first layer disposed at the foot-receiving cavity and the second layer exposed.

Clause 19: The method of any of clauses 16-18, further comprising: prior to injecting the flowable polymeric material: inserting a last in the foot-receiving cavity; and disposing the strobel and a lower portion of the upper into the mold cavity.

Clause 20: The method of clause 19, further comprising: solidifying the flowable polymeric material in the mold cavity to form a midsole secured to the upper; and withdrawing the strobel, the lower portion of the upper, and the midsole from the mold cavity.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear" or "footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. As used in the description and the accompanying claims, unless stated otherwise, a value is considered to be "approximately" equal to a stated value if it is neither more than 5 percent greater than nor more than 5 percent less than the stated value. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of an article of footwear extends between a forefoot region and a heel region of the article of footwear. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of an article of footwear extends between a lateral side and a medial side of the article of footwear. The transverse direction or axis may also be referred to as a lateral direction or axis or a mediolateral direction or axis.

The term "vertical" refers to a direction generally perpendicular to both the lateral and longitudinal directions. For example, in cases where a sole structure is planted flat on a ground surface, the vertical direction may extend from the ground surface upward. It will be understood that each of these directional adjectives may be applied to individual components of a sole structure. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the article of footwear is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the article of footwear in an assembled article of footwear. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. An article of footwear comprising:
   an upper;
   a strobel stitched to the upper at a series of stitches disposed in stitch holes that extend through the strobel; wherein the strobel and the upper define a foot-receiving cavity with an inner surface of the strobel disposed at the foot-receiving cavity; and
   a midsole secured to the upper and with an outer surface of the strobel directly secured to the midsole; wherein:
   the stitch holes are obstructed such that the stitch holes are not exposed to both the midsole and the foot-receiving cavity;
   the strobel includes a first layer and a second layer;
   the first layer includes the inner surface disposed at the foot-receiving cavity;
   the second layer includes the outer surface directly secured to the midsole; and
   the second layer comprises a material that inhibits a flowable polymeric material from penetrating the second layer.

2. The article of footwear of claim 1, wherein the first layer is a textile.

3. The article of footwear of claim 1, wherein the article of footwear is characterized by the absence of an insole.

4. The article of footwear of claim 1, further comprising:
a gasket secured to the outer surface of the strobel, extending over the stitch holes, and configured to seal the stitch holes.

5. The article of footwear of claim 4, wherein:
the series of stitches borders a perimeter of the strobel in a forefoot region, a midfoot region, and a heel region of the strobel; and
the gasket extends over stitch holes in the heel region and the midfoot region.

6. The article of footwear of claim 5, wherein the gasket further extends over stitch holes in the forefoot region.

7. The article of footwear of claim 5, wherein a medial portion of the gasket extends over the stitch holes at a medial side of the strobel and a lateral portion of the gasket extends over the stitch holes at a lateral side of the strobel.

8. The article of footwear of claim 7, wherein the outer surface of the strobel is exposed to the midsole between the medial portion of the gasket and the lateral portion of the gasket.

9. The article of footwear of claim 4, wherein:
the gasket has an inner surface contacting the strobel and extending over the stitch holes; and
the gasket includes an adhesive on the inner surface of the gasket.

10. The article of footwear of claim 4, wherein:
the gasket is a flat, elongated strip with a U-shaped heel portion, a medial arm portion extending forward from the U-shaped heel portion, and a lateral arm portion extending forward from the U-shaped heel portion;
the medial arm portion and the lateral arm portion terminate rearward of a foremost extent of the strobel; and
at least some of stitch holes at which the strobel is stitched to the upper are forward of the medial arm portion and the lateral arm portion and are exposed to the midsole at the outer surface of the strobel.

11. The article of footwear of claim 1, wherein:
the inner surface of the strobel directly abuts an inner surface of the upper along a periphery of the strobel to define a peripheral flange; and
the stitch holes extend through the peripheral flange from the outer surface of the strobel to the outer surface of the upper and are displaced from the foot-receiving cavity.

12. The article of footwear of claim 4, wherein the gasket is between the outer surface of the strobel and an inner surface of the midsole.

13. An article of footwear comprising:
an upper;
a strobel stitched to the upper at a series of stitches disposed in stitch holes that extend through the strobel; wherein the strobel and the upper define a foot-receiving cavity with an inner surface of the strobel disposed at the foot-receiving cavity; and
a midsole secured to the upper and with an outer surface of the strobel disposed at the midsole; wherein the stitch holes are obstructed such that the stitch holes are not exposed to both the midsole and the foot-receiving cavity; and
a gasket secured to the outer surface of the strobel, extending over the stitch holes, and configured to seal the stitch holes;
wherein:
the gasket is a flat, elongated strip with a U-shaped heel portion, a medial arm portion extending forward from the U-shaped heel portion, and a lateral arm portion extending forward from the U-shaped heel portion;
the medial arm portion and the lateral arm portion terminate rearward of a foremost extent of the strobel; and
at least some of stitch holes at which the strobel is stitched to the upper are forward of the medial arm portion and the lateral arm portion and are exposed to the midsole at the outer surface of the strobel.

14. The article of footwear of claim 13, wherein:
the strobel includes a first layer and a second layer;
the first layer includes the inner surface disposed at the foot-receiving cavity;
the second layer includes the outer surface disposed at the midsole; and
the second layer comprises a material that inhibits a flowable polymeric material from penetrating the second layer.

15. The article of footwear of claim 14, wherein the first layer is a textile.

16. The article of footwear of claim 13, wherein the article of footwear is characterized by the absence of an insole.

17. An article of footwear comprising:
an upper;
a strobel stitched to the upper at a series of stitches disposed in stitch holes that extend through the strobel; wherein the strobel and the upper define a foot-receiving cavity with an inner surface of the strobel disposed at the foot-receiving cavity; and
a midsole secured to the upper and with an outer surface of the strobel disposed at the midsole; wherein the stitch holes are obstructed such that the stitch holes are not exposed to both the midsole and the foot-receiving cavity;
wherein:
the inner surface of the strobel directly abuts an inner surface of the upper along a periphery of the strobel to define a peripheral flange;
the stitch holes extend through the peripheral flange from the outer surface of the strobel to the outer surface of the upper and are displaced from the foot-receiving cavity;
the strobel includes a first layer and a second layer;
the first layer includes the inner surface of the strobel and is disposed at the foot-receiving cavity;
the second layer includes the outer surface of the strobel; and
the second layer comprises a material that inhibits a flowable polymeric material from penetrating the second layer.

* * * * *